United States Patent
Gottschall et al.

(10) Patent No.: US 9,880,446 B2
(45) Date of Patent: Jan. 30, 2018

(54) APPARATUS AND METHOD FOR PRODUCING SHORT RADIATION PULSES

(71) Applicants: Fraunhofer-Gesellschaft zur Forderung der angewandten Forschung e.V., Munich (DE); Friedrich-Schiller-Universitat Jena, Jena (DE)

(72) Inventors: Thomas Gottschall, Jena (DE); Jens Limpert, Jena (DE); Andreas Tunnermann, Weimar (DE); Martin Baumgartl, Erfurt (DE)

(73) Assignees: FRIEDRICH-SCHILLER-UNIVERSITAT JENA, Jena (DE); FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 15/032,525

(22) PCT Filed: Oct. 28, 2014

(86) PCT No.: PCT/EP2014/073079
§ 371 (c)(1),
(2) Date: Apr. 27, 2016

(87) PCT Pub. No.: WO2015/063063
PCT Pub. Date: May 7, 2015

(65) Prior Publication Data
US 2016/0320687 A1    Nov. 3, 2016

(30) Foreign Application Priority Data
Oct. 28, 2013    (DE) .................. 10 2013 017 755

(51) Int. Cl.
*G02F 1/39* (2006.01)
*G02F 1/35* (2006.01)

(52) U.S. Cl.
CPC .............. *G02F 1/39* (2013.01); *G02F 1/3536* (2013.01); *G02F 1/395* (2013.01); *G02F 2201/02* (2013.01); *G02F 2203/15* (2013.01)

(58) Field of Classification Search
CPC .......... G02F 1/3536; G02F 1/39; G02F 1/395; G02F 2201/02
See application file for complete search history.

(56) References Cited

U.S. PATENT DOCUMENTS 8,988,767 B2 *   3/2015   Foltynowicz ............. G02F 1/39
                                                              356/433
2014/0247448 A1 *  9/2014   Wise ........................ G01N 21/65
                                                              356/301

FOREIGN PATENT DOCUMENTS

WO   2013/052711 A2   4/2013

OTHER PUBLICATIONS

International Search Report of the International Searching Authority with English Translation issued in the corresponding PCT International Application No. PCT/EP2014/073079, dated Feb. 19, 2015 (7 pages).

(Continued)

*Primary Examiner* — Daniel Petkovsek
(74) *Attorney, Agent, or Firm* — Raymond R. Ferrara; Adams and Reese LLP

(57) ABSTRACT

The invention relates to an apparatus (1) for producing short synchronous radiation pulses at different wavelengths, particularly to an optically parametric oscillator, comprising at least one pump radiation source (2), preferably a pump laser, for outputting radiation at a pump wavelength, and a resonator (3) having a wavelength-dependent effective resonator length, wherein the resonator (3) has a non-linear wave- (Continued)

length converter (4) for producing radiation at a first and a second wavelength; a dispersive element (5) having a strong wavelength-dependent delay characteristic; and a coupling-out element (6) for at least partially coupling-out the radiation from the resonator (3). In addition, the invention relates to a method for producing short radiation pulses by means of an apparatus (1), particularly an optically parametric oscillator.

9 Claims, 3 Drawing Sheets

(56) References Cited

OTHER PUBLICATIONS

Written Opinion of the International Search Authority (Form PCT/ISA/237) with English Translation issued in the corresponding PCT International Application No. PCT/EP2014/073079, (17 pages).
International Preliminary Report on Patentability Chapter I issued in the corresponding PCT International Application No. PCT/EP2014/073079, dated May 3, 2016 (8 pages).
Yujun Deng et al, "Broadly Tunable Femtosecond Parametric Oscillator Using a Photonic Crystal Fiber", Optics Letters, vol. 30, No. 10, May 15, 2005, pp. 1234-1236.
Yue Zhou et al, "Widely Tunable Picosecond Optical Parametric Oscillator Using Highly Nonlinear Fiber", Optics Letters, Optical Society of America, vol. 34, No. 7, Apr. 1, 2009, pp. 989-991.

* cited by examiner

APPARATUS AND METHOD FOR PRODUCING SHORT RADIATION PULSES

The invention relates to an apparatus for producing short radiation pulses, particularly to an optically parametric oscillator, comprising at least one pump radiation source for outputting radiation at a pump wavelength, and an optical resonator.

Short radiation pulses are required in numerous applications. For example, at least two synchronized pulse trains of intensive radiation with a certain frequency spacing are utilized for non-linear Raman spectroscopy or Raman microscopy. The synchronization of pulses, for example of two radiation sources or laser sources, can be realized actively or passively. For example, an active synchronization is realized by harmonizing two radiation sources of a different central frequency through an electronic regulation. A passive synchronization, for instance, is realized in the way that a first radiation source feeds a radiation amplifier by means of non-linear processes.

A particularly advantageous possibility of synchronization is passive, i.e. generating a radiation of a second wavelength directly by means of non-linear wavelength conversion, for example without subsequent post-amplification. Without post-amplification, the process of wavelength conversion must be particularly effective. A possible implementation for this purpose is the optical parametric oscillator (OPO).

Known from prior art are various embodiments of a non-linear (fiber-based) frequency conversion. For example, new wavelengths or frequencies are generated by means of the so-called "Soliton Self-Frequency Shift". Accordingly, the radiation from a pulsed laser source is coupled into a high-grade non-linear fiber. The wavelength of the radiation of the first radiation source to this effect must be near or within the abnormal dispersive frequency range of the non-linear fiber. In another variant, conversion is realized by means of Raman scattering along the fiber in the direction of longer wavelengths.

Another embodiment known from prior art is the fiber-based narrow-band generation of radiation, i.e. just having a small wavelength range, by means of spectral compression and frequency doubling. With the non-linear Raman microscopy, it is particularly advantageous to utilize narrow-band radiation sources covering just a small wavelength range. By means of spectral compression of a supercontinuum or of solitons which arose in a high-grade non-linear fiber, the broadband spectres can be converted in narrow-band mode by means of sum-frequency mixing.

Now, therefore, it is the object of the present invention to provide an apparatus and a method for generating synchronous short radiation pulses, wherein an adaptation of the wavelength is possible with a simultaneous narrow-band generation of the radiation at a certain wavelength.

The present invention achieves this object according to claim 1 in that the apparatus comprises a resonator with a clear wavelength dependence of the effective resonator length, wherein the resonator is comprised of a non-linear wavelength converter for producing radiation at a first (signal) and a second (idler) wavelength, a strongly dispersive element with a significantly wavelength-dependent delay characteristic, and a coupling-out element for at least partially coupling-out of radiation from the resonator. The dispersion in the dispersive element should be so rated that the conversion can proceed in narrow-band mode and with high efficiency at the same time. Likewise, the pump radiation source should feed the resonator with short radiation pulses which have lost as little as possible in narrow bandwidth due to non-linear effects.

The invention particularly relates to a crystal-based or fiber-based OPO whose resonator comprises an element with significant dispersion. The dispersion causes different effective resonator lengths for radiation of different wavelengths or frequencies.

As compared with prior art in technology, the present invention has a particular advantage in that a change in the resonator length of the OP or repetition rate of pump radiation pulses causes a change in the wavelengths of the generated radiation which according to prior art in technology was only possible by way of changing the wavelength of the radiation of the pump radiation source or by altering a spectral filter in the resonator. Furthermore, by means of the significant dispersion in the feedback branch of the resonator, the generated radiation becomes much more narrow-banded than in conventional OPOs.

The apparatus and the method according to the present invention generate spectral bandwidths of the wavelength of the radiation which nearly correspond to the transform limit of the pulse duration of the radiation generated. These properties are based on the fact that an efficient conversion of pump performance into radiation performance can only be realized if the feedback pulses in the resonator have a good temporal overlap with the pump pulses of the pump radiation source.

Through the dispersive element in the resonator, the temporal overlap of the pump radiation and signal radiation is fulfilled for certain wavelength ranges only. These wavelength ranges can be adjusted via a delay characteristic, also called dispersion characteristic, of the dispersive element.

With OPOs, fiber lasers are preferably used as radiation sources, because fiber lasers have the special property of generating and amplifying radiation and laser radiation, in particular, in an efficient manner. Fiber lasers are particularly low-maintenance and stable to exterior interferences. However, a fiber-based generation of synchronized pules of different wavelengths requires processes for frequency conversion by the aid of fibers.

In another embodiment, a conversion of wavelength is realized by means of a so-called four-wave-mixing=FWM. Similarly to the classical optically parametric frequency generation in non-linear crystals, light can be converted in microstructured fibers. The classical optically parametric frequency generation is a three-wave-mixing process which is made possible by crystal non-linearities. Since these do not exist in glass fibers, non-linearities occur here at first which can convert radiation in form of four-wave-mixing. Considering the phase matching condition, the signal radiation which for example is necessary for non-linear Raman spectroscopy can be generated in fibers.

In an advantageous embodiment of the present invention, the dispersive element is a one-mode fiber, also called mono-mode fiber or single-mode fiber. Accordingly, a certain wavelength is transmitted with a delay. This in a simple manner results in a wavelength-dependent effective resonator length.

In another advantageous embodiment, the dispersive element comprises an adjustable delay characteristic. Thereby, the dispersive element can be so adjusted that one (or several) certain wavelength(s) is/are selected for the feedback.

Further possibilities are available to adjust the wavelength according to the present invention. For example, the resonator length, repetition rate of the pump radiation, the pump pulse duration of the pump radiation or the pump pulse shape of the pump radiation can be altered. These alterations can be realized alternately or simultaneously, for example in order to obtain a signal radiation at a certain wavelength with the smallest possible wavelength band or wavelength range by changing the resonator length and simultaneously by changing the repetition rate of the pump radiation.

In an advantageous embodiment, the resonator comprises a variable delay line. Thereby, for example mechanically by means of an appropriate deflection of the radiation, the resonator length can be altered, i.e. independently of the wavelength of the radiation in the resonator.

In another embodiment, a dichroitic mirror (also called dielectric reflector) is utilized for spatial overlapping of the radiation in the resonator with the pump radiation.

In an embodiment with a fiber-integrated OPO, a wavelength multiplexer (also called wavelength-selective coupler) can be utilized in addition to or instead of the dichroitic mirror. Accordingly, the radiation is spatially overlapped in a wavelength-division-multiplexing procedure.

The invention furthermore relates to a method for producing short radiation pulses.

The invention thereby allows for producing short radiation pulses, wherein an adaptation of the wavelength is possible with a simultaneously narrow-band generation of radiation at a certain wavelength.

Further features, details, and advantages of the present invention become evident from the wording of the claims as well as from the description of practical examples based on the illustrative figures.

The invention is explained in more details by way of the following text taking reference to preferred practical examples based on the illustrative figures,
where:

The reference numbers and their meaning are summarized in the list of references. In general, the same reference numbers designate the same parts.

Figure 1:
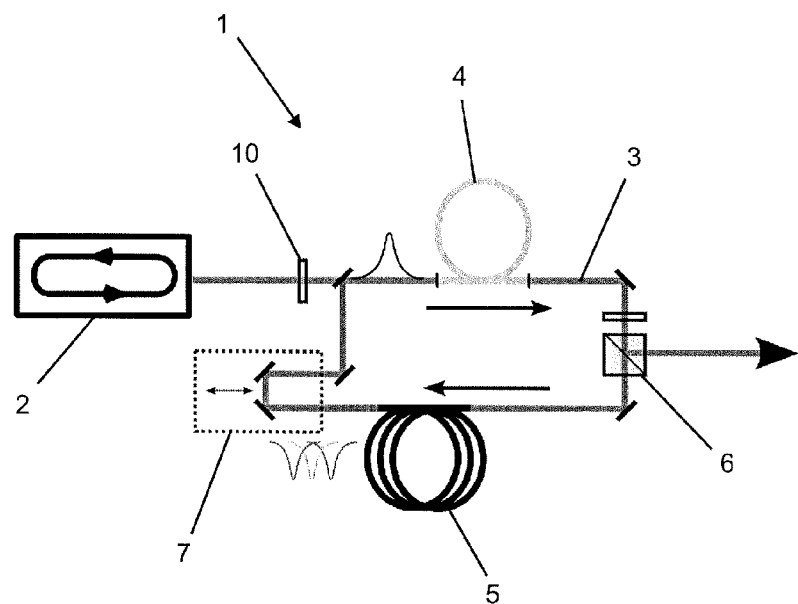
FIG. 1 shows an optically parametric oscillator with a pump radiation source and a resonator.

FIG. 1 shows a schematic arrangement of an apparatus 1 for generating ultra-short radiation pulses. The apparatus 1 may in particular be an optically parametric oscillator OPO. The apparatus is comprised of at least one pump radiation source 2 for emitting radiation of a pump wavelength in short pump pulses (e.g. pulse duration 10-200 ps, pulse repetition rate 100 kHz to 100 MHz, central wavelength 1000-1100 nm, mean power 100 mW to 10 W) and a resonator 3 with a wavelength-dependent resonator length. The pump radiation source 2 preferably is a pump laser, for example a Fiber-Based Master Oszillator Power Amplifier FMOPA. Additionally provided in between of the resonator 3 and the pump radiation source 2 in the embodiment illustrated in FIG. 1 is a spectral filter for filtration of the radiation to be coupled-in into the resonator.

Resonator 3 is comprised of a non-linear wavelength converter (e.g. micro-structured fiber with zero-dispersion wavelength for transversal fundamental mode in a range of 1025-1350 nm) for generating radiation at a first (signal) and a second (idler) wavelength, a dispersive element 5 with a wavelength-dependent delay characteristic, and a coupling-out element 6 for at least partially coupling-out of the radiation from resonator 3. Moreover, resonator 3 in the illustrated embodiment is comprised of a variable delay line 7 which allows for altering the absolute resonator length independently of the wavelength.

By altering the effective and absolute resonator length, it is feasible to vary the wavelength characteristic of the radiation emitted by the OPO. For example, this can be realized together with a repetition rate of the pump radiation source 2, pump pulse duration of the pump radiation source 2 and/or the pump pulse shape of the pump radiation source 2. Thereby it is feasible to generate a narrow-band radiation.

The dispersive element 5 (e.g. an optical fiber with a dispersion in a range of 10-100 ps/nm, preferably approx. 30 ps/nm, and a length of 10-1000 m, preferably approx. 250 m) causes a temporal delay of the feedback pulses in the resonator in a range of 95-100% of the reciprocal value of the repetition rate of the pump pulses or of a multiple thereof. At the same time, the dispersive element 5 can cause a temporal prolongation of the pulses in a range of 1-500 ps per nm spectral bandwidth.

For example, by way of the dispersive element 5, the spectral bandwidth of the radiation can be strongly reduced. Only in the temporal overlap range of the pump pulse with the frequency components of the feedback radiation spectrally staggered one behind the other in the time range occurs an amplification. In the swung-in state, the generated radiation is so narrow-banded that a potentially occurring dispersive pulse prolongation will hardly have any influence. Thus, depending on the intensity of the dispersion, nearly transform-limited spectral bandwidths can be achieved.

The variable delay line 7 in combination with the dispersive element 5 inventively causes e.g. a wavelength alteration of the signal from 1 nm per 10 mm changed resonator length.

Figure 2:
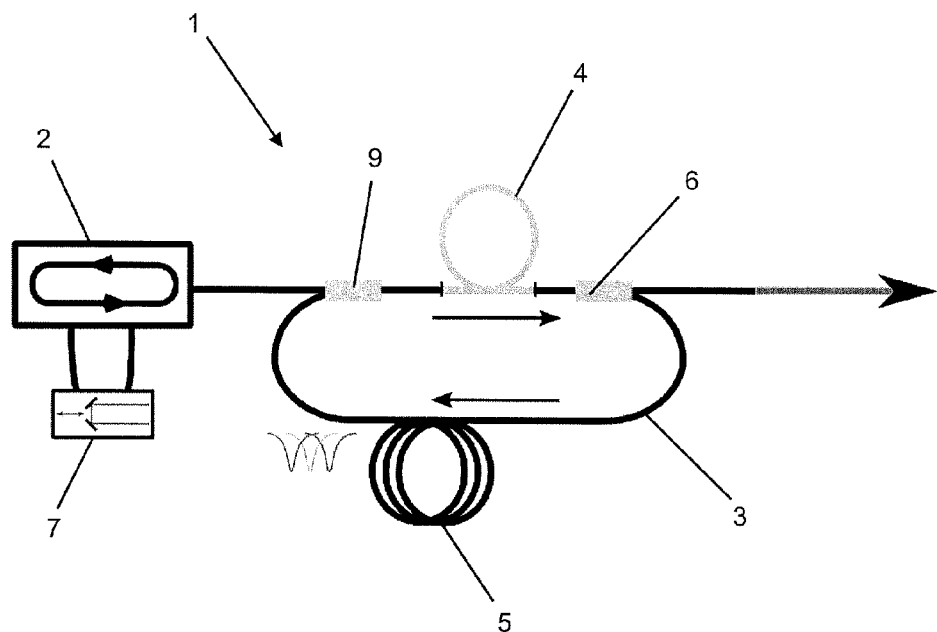
FIG. 2 shows an optically parametric oscillator with a pump radiation source comprising a variable delay line.
Figure 3:
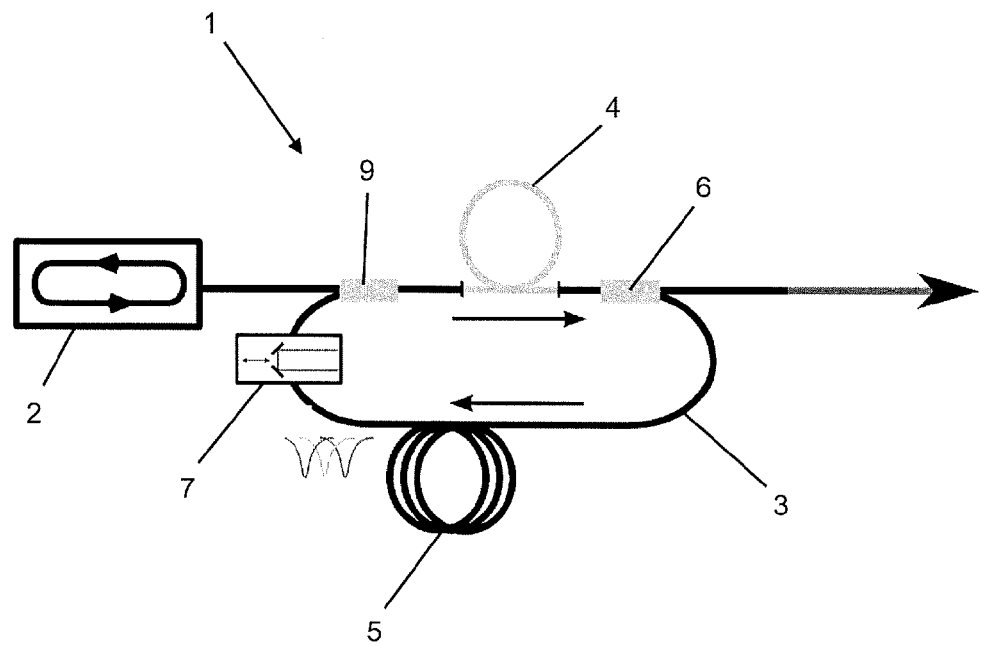
FIG. 3 shows an optically parametric oscillator with a resonator comprising a variable delay line.

FIG. 2 shows an embodiment of apparatus 1 similar to the apparatus 1 illustrated in FIG. 1, wherein here it is not the resonator that comprises a variable delay line 7 but the pump radiation source 2 is provided with a variable delay line. Shown in FIG. 3 is a variant of the embodiment illustrated in FIG. 1. A wavelength multiplexer 9 is provided for. The wavelength multiplexer 9 allows for the overlap of the radiation circulating in resonator 3 with the radiation of the pump radiation source 2. In particular, the wavelength multiplexer 9 is utilized with a fiber-based OPO.

The illustrated different embodiments of apparatus 1 may in particular be configured as a fiber-based optically parametric oscillator FOPO. Accordingly, e.g. a fiber-based master oscillator power amplifier FMOPA is utilized to provide radiation which is transmitted into the non-linear wavelength converter, for example in the range of the Ytterbium emission range of 1030 nm when using an Ytterbium-based FMOPA.

By way of four-wave mixing FWM, the wavelength converter generates a radiation of a signal and idler radiation. For example, by choosing a zero-dispersion wavelength in the range of 1035 to 1070 nm, it is possible to generate a signal radiation with a wavelength of 750 to 1000 nm and, corresponding to the energy conservation, an idler radiation with a wavelength of 1100 nm to 1700 nm. The bandwidth of the amplification of the FWM depends on the phase matching for the parametric process.

The degree of coupling-out the coupling-out element 6 can be determined through a combination of a broadband waveplate with a polarization cube. A small part of the radiation in resonator 3, preferably less than 10%, remains in resonator 3 and is coupled-in into the dispersive element 5. The remainder of the radiation is coupled-out and is available to the application, for example a Raman spectroscopy or a Raman microscopy.

In the dispersive element 5, the feedback radiation is temporally broadened, depending on the intensity of the dispersion. At the same time, the radiation in conjunction with the variable delay line 7 is so delayed that the feedback radiation overlaps temporally with one of the next pump pulses in the wavelength converter 4.

An appropriate dichroitic mirror 8 can be utilized for the spatial overlap of the radiation with the pump pulses. In a fiber-integrated solution, instead of the dichroitic mirror 8, a WDM 9 is utilized which overlaps the feedback radiation with one of the next pump pulses.

Likewise it is possible to provide a spectral filter 10 in the resonator in order to thereby generate a variable radiation within the amplification bandwidth of the FWM. In some cases, according to the dispersion, it is necessary to adapt the resonator length to the cycle time of the relevant filtrated radiation. Alternatively, for example by means of the dispersive feedback, it is possible to select the wavelength of the radiation within the amplification bandwidth of the parametric amplifier, without an additional spectral filter.

With the first pump pulse in the wavelength converter 4, spontaneously produced photons, for example of the FWM process, are generated over the range of the phase-matched amplification range. The pulse duration of the radiation arising is within the range of the pulse duration of the pump pulse.

The dispersion of the dispersive element 5 causes the effect that the pulse duration of the radiation after the feedback, preferably through a mono-mode fiber, exceeds that of the pump pulses. Depending on the delay of the radiation relative to the next temporally overlapped pump pulse, it is thereby possible to generate and adapt radiation within the amplification bandwidth of the FWM. Accordingly, the pump pulse acts as a kind of a gate within the dispersively stretched radiation and thus selects certain frequencies in resonator 3.

For example, on prolongating the effective resonator length, the dispersion causes a spectral shift of the signal radiation into the direction of shorter wavelengths. In particular, the delay generates a temporal delay of the feedback radiation in a range of up to 10 ns from the variable delay line 7 and the dispersive element 5.

Figure 4:
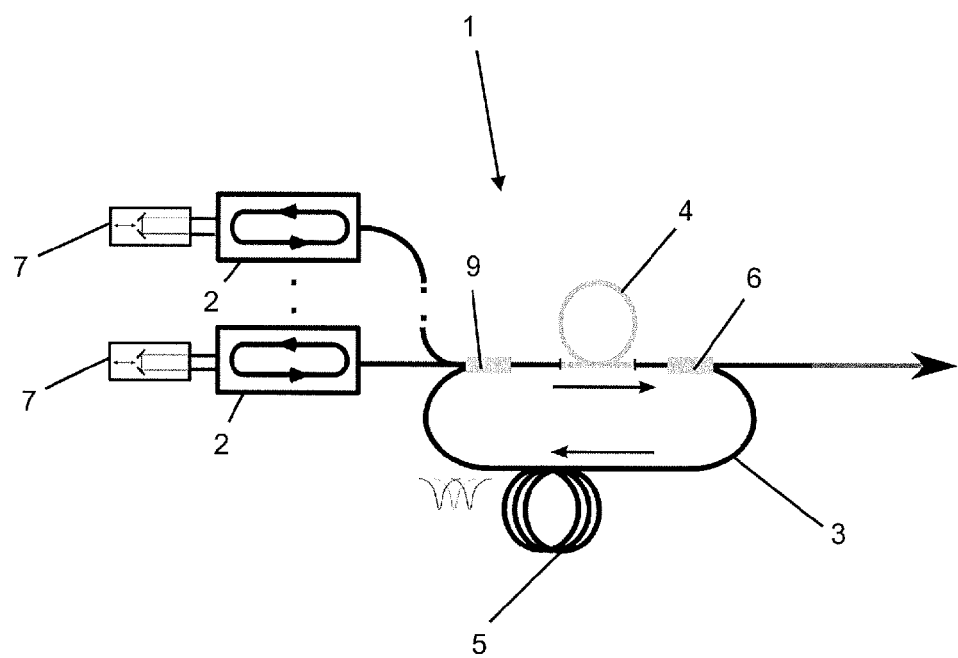
FIG. 4 shows an optically parametric oscillator with a plurality of pump radiation sources comprising a variable delay line.

FIG. 4 shows an embodiment of apparatus 1 according to the embodiment illustrated in FIG. 2, wherein a plurality of pump radiation sources 2 is provided, each of which comprised of one variable delay line in order to achieve different pulse repetition rates for different pump wavelengths. Thus, for example, a plurality of pump pulse sources can utilize one and the same resonator for conversion.

Figure 5:
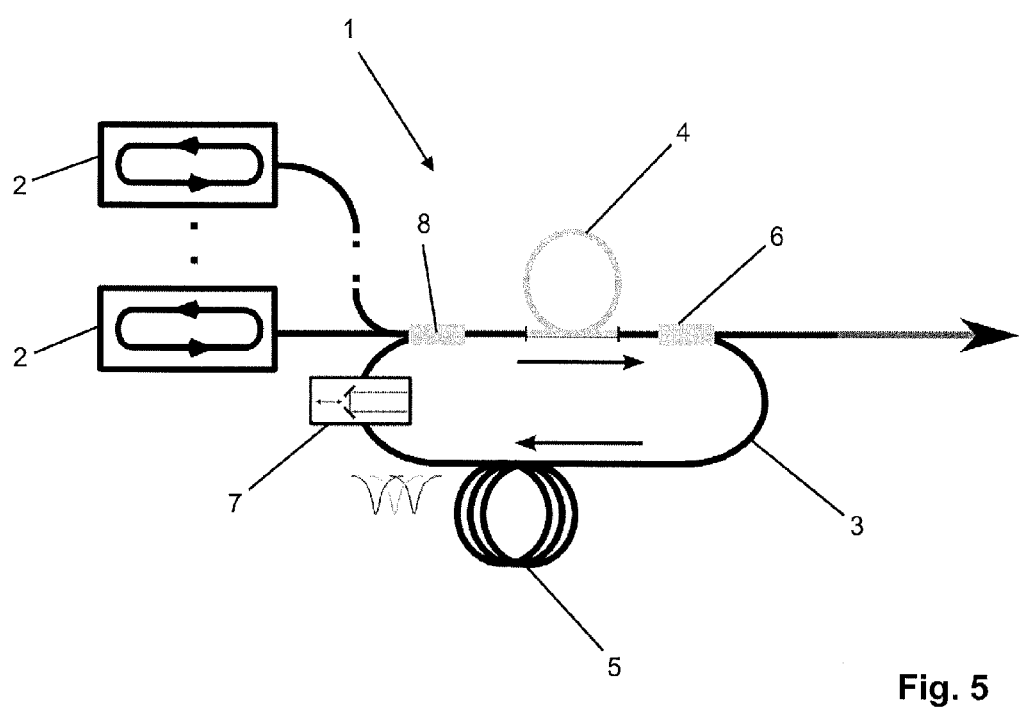
FIG. 5 shows an optically parametric oscillator with a plurality of pump radiation sources and a resonator comprising a variable delay line.

FIG. 5 shows an embodiment of apparatus 1 according to the embodiment illustrated in FIG. 1, wherein a plurality of pump radiation sources 2 is provided, but wherein in contrast to FIG. 4 the resonator 3 comprises a variable delay line.

The invention claimed is:

1. An apparatus for producing short radiation pulses, comprising at least:
   a pump radiation source for outputting pulsed radiation at a pump wavelength, and
   an optical resonator having a wavelength-dependent effective resonator length, wherein the optical resonator comprises:
      a non-linear wavelength converter for producing radiation with at least a first wavelength and a second wavelength;
      a dispersive element having a wavelength-dependent delay characteristic; and
      a coupling-out element for at least partially coupling-out the radiation produced by the optical resonator,
      wherein the dispersive element is an optical fiber having a dispersion of 10 ps/nm to 100 ps/nm and a length of 10 m to 1000 m,
      further wherein the optical resonator comprises a variable delay line for altering the effective resonator length.

2. An apparatus according to claim 1, wherein the dispersive element is a single-mode fiber.

3. An apparatus according to claim 1, wherein the pump radiation source comprises a variable delay line.

4. An apparatus according to claim 1, wherein the optical resonator comprises a dichroic mirror for spatial overlap of the radiation of the pump wavelength with the radiation of the first or second wavelength.

5. An apparatus according to claim 1, wherein the optical resonator comprises a wavelength multiplexer (WDM).

6. An apparatus according to claim 1, wherein the optical resonator comprises a spectral filter.

7. A method for producing short radiation pulses by means of an optical parametric oscillator, said method comprising at least the following steps:
   emitting pulsed radiation at a pump wavelength through a pump radiation source;
   providing an optical resonator having a wavelength-dependent effective resonator length, a non-linear wavelength converter, a dispersive element with a wavelength-dependent delay characteristic, and a coupling element;
      generating radiation at least at a first wavelength and a second wavelength with said non-linear wavelength converter;
      delaying said radiation through said dispersive element;
      at least partially coupling-out the radiation produced by the optical resonator with said coupling-out element; and
   tuning the wavelengths by altering the effective resonator length with a variable delay line,
   wherein the dispersive element is an optical fiber having a dispersion of 10 ps/nm to 100 ps/nm and a length of 10 m to 1000 m.

8. An apparatus for producing short radiation pulses, comprising at least:
   a pump radiation source for outputting pulsed radiation at a pump wavelength, and
   an optical resonator having a wavelength-dependent effective resonator length, wherein the optical resonator comprises:
      a non-linear wavelength converter for producing radiation with at least a first wavelength and a second wavelength;
      a dispersive element having a wavelength-dependent delay characteristic; and
      a coupling-out element for at least partially coupling-out the radiation produced by the optical resonator,
      wherein the dispersive element is an optical fiber having a dispersion of 10 ps/nm to 100 ps/nm and a length of 10 m to 1000 m, further wherein the pump radiation source is capable of at least one of a variable repetition rate and a variable pump pulse shape.

9. A method for producing short radiation pulses by means of an optical parametric oscillator, said method comprising at least the following steps:
   emitting pulsed radiation at a pump wavelength through a pump radiation source;
   providing an optical resonator having a wavelength-dependent effective resonator length, a non-linear wavelength converter, a dispersive element with a wavelength-dependent delay characteristic, and a coupling element;
   generating radiation at least at a first wavelength and a second wavelength with said non-linear wavelength converter;
   delaying said radiation through said dispersive element;
   at least partially coupling-out the radiation produced by the optical resonator with said coupling-out element; and
   tuning the wavelengths by at least one of altering a repetition rate and a pump pulse shape of the radiation,
   wherein the dispersive element is an optical fiber having a dispersion of 10 ps/nm to 100 ps/nm and a length of 10 m to 1000 m.

* * * * *